US008491992B2

(12) United States Patent
Schmidt et al.

(10) Patent No.: US 8,491,992 B2
(45) Date of Patent: Jul. 23, 2013

(54) LAMINAR COMPONENT MADE FROM COMPOSITE MATERIAL

(75) Inventors: Marco Schmidt, Speyer (DE); Marco Balbo Block, Osnabrueck (DE); Volker Schmidt, Lemfoerde (DE); Annerose Heimes-Scheller, Senden (DE); Lothar Jandel, Muenster (DE)

(73) Assignee: BASF SE, Ludwigshafen (DE)

( * ) Notice: Subject to any disclaimer, the term of this patent is extended or adjusted under 35 U.S.C. 154(b) by 119 days.

(21) Appl. No.: 13/140,221

(22) PCT Filed: Dec. 4, 2009

(86) PCT No.: PCT/EP2009/066386
§ 371 (c)(1),
(2), (4) Date: Jun. 16, 2011

(87) PCT Pub. No.: WO2010/076118
PCT Pub. Date: Jul. 8, 2010

(65) Prior Publication Data
US 2011/0247215 A1 Oct. 13, 2011

(30) Foreign Application Priority Data
Dec. 17, 2008 (EP) ..................................... 08171938

(51) Int. Cl.
*B32B 3/26* (2006.01)
*B05D 7/14* (2006.01)
(52) U.S. Cl.
USPC ................ 428/319.1; 428/319.3; 428/402.22; 428/402.24; 427/407.1; 427/404
(58) Field of Classification Search
USPC ................. 428/319.1, 319.3, 402.22, 402.24; 427/407.1, 404
See application file for complete search history.

(56) References Cited

U.S. PATENT DOCUMENTS

| 2,800,457 | A | 7/1957 | Green et al. |
| 3,041,289 | A | 6/1962 | Katchen et al. |
| 4,021,595 | A | 5/1977 | Kiritani et al. |
| 5,456,852 | A | 10/1995 | Isiguro |
| 6,000,438 | A | 12/1999 | Ohrn |
| 2001/0048984 | A1 | 12/2001 | Legare |
| 2005/0055982 | A1 | 3/2005 | Medina |
| 2005/0106341 | A1 | 5/2005 | Legare |
| 2008/0014411 | A1 | 1/2008 | Schmidt et al. |

FOREIGN PATENT DOCUMENTS

| DE | 101 24 333 | 11/2002 |
| DE | 101 39 171 | 2/2003 |
| DE | 101 63 162 | 7/2003 |
| DE | 10 2004 041298 | 3/2006 |
| EP | 0 392 876 | 10/1990 |
| EP | 0 535 384 | 4/1993 |
| EP | 0 562 344 | 9/1993 |
| EP | 0 974 394 | 1/2000 |
| EP | 1 029 018 | 8/2000 |
| EP | 1 321 182 | 6/2003 |
| EP | 1 703 033 | 9/2006 |
| GB | 0 870 476 | 6/1961 |
| WO | 2008 006762 | 1/2008 |
| WO | 2008 046839 | 4/2008 |
| WO | 2008 071649 | 6/2008 |

OTHER PUBLICATIONS

International Search Report issued Apr. 28, 2010 in Application No. PCT/EP2009/066386 (With English Translation of Category of Cited Documents).
International Search Report issued Apr. 28, 2010 in PCT/EP09/066386 filed Dec. 4, 2009.

*Primary Examiner* — Hai Vo
(74) *Attorney, Agent, or Firm* — Oblon, Spivak, McClelland, Maier & Neustadt, L.L.P.

(57) ABSTRACT

The present invention relates to a sheet-like construction element composed of composite material, comprising two metallic outer layers, a rigid polyurethane foam layer, and a compact polyurethane layer which comprises microcapsules with a capsule core composed of latent-heat-accumulator material, and also to a process for its production, and to its use.

20 Claims, No Drawings

LAMINAR COMPONENT MADE FROM COMPOSITE MATERIAL

The present application relates to a sheet-like construction element composed of composite material comprising two metallic outer layers and a rigid polyurethane foam layer.

Sheet-like construction elements comprising two metallic outer layers and a rigid polyurethane foam layer, known as sandwich elements, are used not only as structural elements in domestic construction but also in industrial construction for facades and roofs of industrial buildings, and as structural elements in cold-store construction, in sectional doors, in portable office accommodation, or in residential-trailer construction, where their wide use is based on their very good insulating properties. However, because of their low mass, the buildings have little ability to buffer temperature peaks.

Interior and exterior temperature loads cause very rapid rises in temperature in the interior of buildings of this type. This undesirable property is summarized by the term "unsatisfactory internal atmospheric conditions".

In summer, the mass of a structure accumulates inflowing heat during the day and in the ideal case thus keeps the internal temperature constant. The accumulated heat is then released back into the external atmosphere under cooler nighttime conditions. If a pleasant internal temperature and humidity are to be achieved in the building, even in summer, without powered air-conditioning, the building must have a certain thermal mass. However, buildings composed of sandwich elements lack any such large thermal mass.

Latent-heat-accumulator materials—also termed phase-change materials (abbreviated to PCM)—have been studied in recent years, and are a new materials combination within construction materials. Their mode of action is based on the enthalpy generated during solid/liquid phase transition, involving absorption of energy or release of energy to the environment at constant temperature. They may therefore be used to maintain a constant temperature within a specified temperature range. The latent-heat-accumulator materials may also be liquid depending on temperature, and they cannot therefore be used directly with construction materials for fear of emissions into the internal atmosphere or of separation from the construction material.

EP-A-1 703 033 teaches construction elements for the fitting-out of interiors, having two metal outer layers, where the intermediate layer comprises a latent-heat-accumulator material.

WO 2006/021306 teaches a composite material with a metal outer layer, with a gypsum-plaster construction panel, and with a rigid polyurethane foam layer connecting said two sheets. The gypsum-plaster construction panel comprises microcapsules with a capsule core composed of latent-heat-accumulator material. However, construction elements with gypsum plasterboard have a span width limited to from 2 to 3 meters, and this limits their possible uses. By way of example, use in roof structures spanning relatively large areas is impossible. It was an object of the present invention to provide construction elements which have improved mechanical stability, in particular improved span width.

A further object was to find an improved production process for these construction elements, which also permits their production in continuous form.

It was an object of the present invention to improve sheet-like construction elements composed of a composite material with two metal outer layers in such a way that the buildings produced therefrom have better atmospheric conditions.

Said object is achieved by sheet-like construction element composed of composite material, comprising two metallic outer layers, a rigid polyurethane foam layer, and a compact polyurethane layer which comprises microcapsules with a capsule core composed of latent-heat-accumulator material. According to the invention, the compact polyurethane layer comprises microcapsules with a capsule core composed of latent-heat-accumulator material.

For the purposes of this application, a sheet-like construction element is a structure whose thickness is small when compared not only with its length but also with its width. Its thickness is preferably $\leq \frac{1}{5}$ of its length and also of its width.

The sheet-like construction elements here can have a topology generated by way of example via shaping processes.

According to one embodiment, the sheet-like construction element has a compact polyurethane layer. Seen from the interior of the space, the resultant sequence of the layers is as follows:
1. metallic outer layer (A),
2. compact polyurethane layer (B),
3. rigid polyurethane foam layer (C), and
4. a metallic outer layer (A').

According to another embodiment, the sheet-like construction element has a second compact polyurethane layer. Seen from the interior of the space, the resultant sequence of the layers is as follows:
1. metallic outer layer (A),
2. compact polyurethane layer (B),
3. rigid polyurethane foam layer (C),
4. compact polyurethane layer (B), and
5. a metallic outer layer (A).

In the case of sandwich elements with the structure A-B-C-A', the location of the metallic outer layer A' is generally in the open air. Interior-space applications are also conceivable, examples being ceiling panels, wall elements, and room-in-room systems. For applications such as room-in-room systems, or internal partitions, preference is given to sheet-like construction elements with the structure A-B-C-B-A.

The Metallic Outer Layer

The two metallic outer layers here can be different. A distinction is then made between the material that borders the interior of the space (A) and the external outer layer (A').

The two layers do not have to be identical either in their shape or their material. However, sheet-like construction elements with the structure A-B-C-B-A preferably have identical metallic outer layers.

Outer layers used can be flexible or rigid, preferably rigid outer layers. It is not essential that the outer layer has been profiled, and the form in which it is used can also be smooth, or that of a stamped, contoured, or molded sheet (e.g. pantile effect).

The metallic outer layer can be an uncoated or coated layer. Preferred metals are aluminum, steel, galvanized or aluminized steel, copper, zinc, or other types of metal strip or metal panel. Preferred mention may be given to aluminum foils, aluminum sheet, copper sheet, or steel sheet, particularly steel sheet.

The metallic outer layers can be pretreated, for example by corona treatment, electric-arc treatment, plasma treatment, or other conventional methods.

The metallic outer layer, preferably the exterior metallic outer layer (A'), can have been modified with the conventional materials used for construction elements of this type, in order to increase weathering resistance.

The metallic outer layers also often have organic coatings. The thickness of these organic layers can be from 0.5 μm to 500 μm. An important coating process is strip coating, also termed coil coating. In this finishing process, the metal strip, very often galvanized steel strip and galvanized aluminum strip, of width up to 2070 mm, is coated with a lacquer or plastics film, and rewound, and then processed by processors, for example to give sandwich elements. The coil coating process is known to the person skilled in the art and is described by way of example in Kittel-Lehrbuch der Lacke and Beschichtungen [Textbook of lacquers and coatings], volume 6 "Anwendung von Lacken and sonstigen Beschichtungen" [Use of lacquers and other coatings], 2nd edition, S. Hirzel Verlag, Stuttgart, 2008. The organic coatings applied to the metal strip can have been applied in one or more layers with up to 6 layers on the upper side. There are generally one or two organic layers applied on the underside which comes into contact with the rigid polyurethane foam layer during further processing.

Examples of the structure of the organic coatings can use resins based on epoxy, polyester, polyurethane, acrylate, polyvinyl chloride (with plasticizers or esters), and polyvinylidene fluoride. Typical crosslinking agents are based on amino resins and/or isocyanate. Other constituents in the organic coatings are pigments, catalysts, and additives.

The Compact Polyurethane Layer

A compact polyurethane layer is a polymer layer whose density is from 400 to 1200 kg/m$^3$, preferably from 500 to 1000 kg/m$^3$, particularly preferably from 600 to 950 kg/m$^3$.

It is usually produced via reaction of organic di- and/or polyisocyanates a) with compounds b) having at least two hydrogen atoms reactive toward isocyanate groups, preferably polyols. The expression "reactive compact polyurethane system" is used below for the mixture of the components which has not yet been crosslinked.

The reaction ratio is preferably selected in such a way that the ratio of the number of isocyanate groups to the number of hydrogen atoms reactive toward isocyanates in the reaction mixture is from 0.8 to 1.8:1, preferably from 1 to 1.6:1.

Organic di- and polyisocyanates a) that can be used are aliphatic, cycloaliphatic, and preferably aromatic polyfunctional isocyanates. Specific examples that may be mentioned are tolylene 2,4- and 2,6-diisocyanate (TDI) and the corresponding isomer mixtures, diphenylmethane 4,4'-, 2,4'-, and 2,2'-diisocyanate (MDI) and the corresponding isomer mixtures, and mixtures composed of diphenylmethane 4,4'- and 2,4'-diisocyanates, and other specific examples are polyphenyl polymethylene polyisocyanates, mixtures composed of diphenylmethane 4,4'-, 2,4'-, and 2,2'-diisocyanates and of polyphenyl polymethylene polyisocyanates (crude MDI), and mixtures composed of crude MDI and tolylene diisocyanates. The organic di- and polyisocyanates can be used individually or in the form of a mixture.

The materials known as modified polyfunctional isocyanates are also often used, i.e. products which are obtained via chemical reaction of organic di- and/or polyisocyanates. Examples that may be mentioned are di- and/or polyisocyanates comprising uretdione, carbamate, carbodiimide, allophanate, isocyanurate, and/or urethane groups. The modified organic di- and polyisocyanates can optionally be mixed with one another or with unmodified organic di- and polyisocyanates, e.g. diphenylmethane 2,4'- or 4,4'-diisocyanate, crude MDI, or tolylene 2,4- and/or 2,6-diisocyanate.

It is also possible to use reaction products of polyfunctional isocyanates with polyhydric polyols, these reaction products being known as prepolymers, or else a mixture of these with other di- and polyisocyanates.

An organic polyisocyanate which has proven particularly successful is crude MDI with NCO content of from 29 to 33% by weight and with viscosity at 25° C. in the range from 100 to 2000 mPa·s, particularly in the range from 100 to 800 mPa·s.

Compounds b) used, having at least two hydrogen atoms reactive toward isocyanate, are generally those which bear at least two reactive groups selected from OH, SH, NH, NH$_2$ groups, and CH-acidic groups in the molecule, particularly polyether polyols and polyester polyols.

The polyester polyols are mostly produced via condensation of polyhydric alcohols, preferably diols, having from 2 to 12 carbon atoms, preferably from 2 to 6 carbon atoms, e.g. ethylene glycol, diethylene glycol, butanediol, trimethylolpropane, glycerol, pentaerythritol, with polybasic carboxylic acids having from 2 to 12 carbon atoms, e.g. succinic acid, glutaric acid, adipic acid, suberic acid, azelaic acid, sebacic acid, decanedicarboxylic acid, maleic acid, fumaric acid, and preferably phthalic acid, isophthalic acid, terephthalic acid, the isomers of naphthalenedicarboxylic acids, or the anhydrides of the acids.

Other starting materials that can also be used during production of the polyester polyols are hydrophobic substances. The hydrophobic substances are substances insoluble in water which comprise a nonpolar organic radical, and also have at least one available reactive group selected from hydroxy, carboxylic acid, carboxylic ester, or a mixture thereof. The equivalent weight of the hydrophobic materials is preferably from 130 to 1000 g/mol. Examples of materials that can be used are fatty acids, such as stearic acid, oleic acid, palmitic acid, lauric acid, or linoleic acid, and also fats and oils, such as castor oil, maize oil, sunflower oil, soybean oil, coconut oil, olive oil, or tall oil. If polyester polyols comprise hydrophobic substances, the proportion of the hydrophobic substances, based on the total monomer content of the polyester polyol, is preferably from 1 to 30 mol %, particularly preferably from 4 to 15 mol %.

The functionality of the polyester polyols used is mostly from 1.5 to 4, their OH number being from 50 to 400 mg KOH/g, preferably from 150 to 300 mg KOH/g.

The polyether polyols are produced by known processes, for example via anionic polymerization of alkylene oxides with addition of at least one starter molecule in the presence of catalysts, such as alkali metal hydroxides.

Alkylene oxides used are mostly ethylene oxide and/or propylene oxide, preferably pure propylene 1,2-oxide.

Starter molecules that are in particular used are compounds having at least 2, preferably from 2 to 4, hydroxy groups, or having at least two primary amino groups, in the molecule.

Preferred starter molecules used having at least 2, preferably from 2 to 8, hydroxy groups in the molecule are propylene glycol, dipropylene glycol, trimethylolpropane, glycerol, pentaerythritol, sugar compounds, such as glucose, sorbitol, mannitol, and sucrose, polyhydric phenols, and resols, such as oligomeric condensates composed of phenol and formaldehyde, and Mannich condensates composed of phenols and formaldehyde and of dialkanolamines, and also melamine.

Preferred starter molecules used having at least two primary amino groups in the molecule are aromatic di- and/or polyamines, such as phenylenediamines, 2,3-, 2,4-, 3,4-, and 2,6-tolylenediamine, and 4,4'-, 2,4'-, and 2,2'-diaminodiphenylmethane, and also aliphatic di- and polyamines, such as ethylenediamine.

The functionality of the polyether polyols is from 2 to 4, preferably from 2 to 3, their hydroxy numbers preferably being from 30 mg KOH/g to 800 mg KOH/g, and in particular from 150 mg KOH/g to 570 mg KOH/g.

Among the compounds b) having at least two hydrogen atoms reactive toward isocyanate are also the crosslinking agents and chain extenders which are optionally used concomitantly. Addition of difunctional chain extenders, or of crosslinking agents of functionality three and higher or else optionally mixtures thereof can prove advantageous for modification of mechanical properties. Preferred chain extenders and/or crosslinking agents used are alkanolamines, and diols and/or triols, in particular diols and/or triols whose molecular weights are below 400, preferably from 60 to 300.

The amount advantageously used of chain extenders, crosslinking agents, or a mixture thereof is from 1 to 30% by weight, preferably from 2 to 10% by weight, based on component b), preferably the polyol component.

Further information concerning the polyether polyols and polyester polyols used, and also their production, is found by way of example in Kunststoffhandbuch [Plastics handbook], volume 7 "Polyurethane" [Polyurethanes] edited by Günter Oertel, Carl-Hanser-Verlag Munich, 3rd edition, 1993.

The compact polyurethane layer is usually produced in the presence of catalysts, and also, if necessary, further auxiliaries and/or additives which are well known in polyurethane chemistry and are described in DE-A-101 24 333, which is expressly incorporated herein by way of reference. Auxiliaries and/or additives that can be used are the substances known per se for this purpose, examples being surfactants, fillers, pigments, dyes, flame retardants, hydrolysis stabilizers, antistatic agents, and fungistatic and bacteriostatic agents. Further details concerning the starting materials used for the conduct of the process of the invention, and catalysts, and also auxiliaries and/or additives are found by way of example in Kunststoffhandbuch, volume 7, "Polyurethane" [Polyurethanes] Carl-Hanser-Verlag Munich, 1st edition, 1966, 2nd edition, 1983, and 3rd edition, 1993.

Catalysts that can be used are any of the compounds which accelerate the isocyanate-water reaction or the isocyanate-polyol reaction. These comprise amine-based catalysts and catalysts based on organometallic compounds.

Examples of catalysts that can be used and that are based on organometallic compounds are organotin compounds, such as stannous salts of organic carboxylic acids, e.g. stannous acetate, stannous octoate, stannous ethylhexoate, and stannous laurate, and the dialkyltin(IV) salts of organic carboxylic acids, such as dibutyltin diacetate, dibutyltin dilaurate, dibutyltin maleate, and dioctyltin diacetate, and also bismuth carboxylates, such as bismuth(III) neodecanoate, bismuth 2-ethylhexanoate, and bismuth octanoate, or alkali metal salts of carboxylic acids, e.g. potassium acetate or potassium formate.

The catalyst used preferably comprises a mixture comprising at least one tertiary amine. These tertiary amines are usually compounds which can also bear groups reactive toward isocyanate, e.g. OH, NH, or $NH_2$ groups. Some of the catalysts most frequently used are bis(2-dimethylaminoethyl) ether, N,N,N,N,N-pentamethyldiethylenetriamine, N,N,N-triethylaminoethoxyethanol, dimethylcyclohexylamine, dimethylbenzylamine, triethylamine, triethylenediamine, pentamethyldipropylenetriamine, dimethylethanolamine, N-methylimidazole, N-ethylimidazole, tetramethylhexamethylenediamine, tris-(dimethylaminopropyl)hexahydrotriazine, dimethylaminopropylamine, N-ethylmorpholine, diazabicycloundecene, and diazabicyclononene.

Examples of suitable flame retardants are brominated ethers (Ixol B 251), brominated alcohols, such as dibromoneopentyl alcohol, tribromoneopentyl alcohol, and PHT-4-diol. Preference is given to use of bromine-free flame retardants, such as chlorinated phosphates, e.g. tris(2-chloroethyl) phosphate, tris(2-chloroisopropyl) phosphate (TCPP), tris(1,3-dichloroisopropyl) phosphate, and tetrakis(2-chloroethyl) ethylene diphosphate, or a mixture thereof.

In addition to the abovementioned halogen-substituted phosphates, it is also possible to use inorganic flame retardants, such as red phosphorus or preparations comprising red phosphorus, or to use expandable graphite, aluminum oxide hydrate, antimony trioxide, arsenic oxide, ammonium polyphosphate, and calcium sulfate, or cyanuric acid derivatives, such as melamine, or a mixture composed of at least two flame retardants, e.g. ammonium polyphosphates and melamine, or else optionally starch.

Other liquid halogen-free flame retardants that can be used are diethyl ethanephosphonate (DEEP), triethyl phosphate (TEP), dimethyl propanephosphonate (DMPP), diphenyl cresyl phosphate (DPK), and others.

For the purposes of the present invention, the preferred amount used of the flame retardants, based on the total weight of the components of the compact polyurethane system, is from 0 to 25%.

The amounts reacted with one another of the di- and polyisocyanates, and of the compounds having hydrogen atoms reactive toward isocyanates, are such that the isocyanate index is in the range from 90 to 700, preferably in the range from 100 to 140.

The compact polyurethane layer is produced without addition of blowing agents. However, the polyols used can comprise residual water, which acts as blowing agent. The proportion of residual water in polyols used is preferably <1% by weight, preferably <0.5% by weight, particularly <0.2% by weight. The proportion of water can be lowered here via "drying" of the polyols, using water-absorbent additives, such as molecular sieve (additives having physical action), or oxazolidines (additives having chemical action).

According to another embodiment, an antifoam, or water-absorbent additives, is/are added to the reactive compact polyurethane system.

The Microcapsules

The microcapsules comprised according to the invention in the compact polyurethane layer comprise a capsule core composed of latent-heat-accumulator material, and comprise a capsule wall composed of polymer. The capsule core is mainly composed of more than 95% by weight of latent-heat-accumulator material. The capsule core here can be either solid or liquid, as a function of the temperature.

The production process generally requires that a protective colloid be incorporated concomitantly into the capsule wall, therefore likewise being a constituent of the capsule wall. It is generally in particular the surface of the polymer that comprises the protective colloid. Up to 10% by weight of the material, based on the total weight of the microcapsules, can therefore be protective colloid.

The average size of the capsules (Z-average from light scattering) is from 0.5 to 50 µm, preferably from 0.5 to 30 µm. The ratio by weight of capsule core to capsule wall is generally from 50:50 to 95:5. A core/wall ratio of 70:30 to 93:7 is preferred.

Latent-heat-accumulator materials are defined as substances which have a phase transition within the temperature range within which heat transfer is intended, and they are therefore also often termed PCM (phase change material) in the literature. They are preferably an organic lipophilic substance having its solid/liquid phase transition within the temperature range from −20 to 120° C.

Examples that may be mentioned are:
aliphatic hydrocarbon compounds, such as saturated or unsaturated $C_{10}$-$C_{40}$ hydrocarbons which are branched or preferably linear, e.g. n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane, and also cyclic hydrocarbons, e.g. cyclohexane, cyclooctane, cyclodecane;

aromatic hydrocarbon compounds, such as benzene, naphthalene, biphenyl, o- or m-terphenyl, $C_1$-$C_{40}$-alkyl-substituted aromatic hydrocarbons, e.g. dodecylbenzene, tetradecylbenzene, hexadecylbenzene, hexylnaphthalene, or decylnaphthalene;

saturated or unsaturated $C_6$-$C_{30}$ fatty acids, such as lauric, stearic, oleic, or behenic acid, preferably eutectic mixtures composed of decanoic acid with, for example, myristic, palmitic, or lauric acid;

fatty alcohols, such as lauryl, stearyl, oleyl, myristyl, or cetyl alcohol, mixtures, such as coconut fatty alcohol, and what are known as the oxo alcohols, obtained via hydroformylation of α-olefins and further reactions;

$C_6$-$C_{30}$ fatty amines, such as decylamine, dodecylamine, tetradecylamine, or hexadecylamine;

esters, such as $C_1$-$C_{10}$-alkyl esters of fatty acids, e.g. propyl palmitate, methyl stearate, or methyl palmitate, or else preferably their eutectic mixtures, or methyl cinnamate;

natural or synthetic waxes, such as montan acid waxes, montan ester waxes, carnauba wax, polyethylene wax, oxidized waxes, polyvinyl ether wax, ethylene-vinyl acetate wax, or hard waxes from the Fischer-Tropsch process;

halogenated hydrocarbons, such as chloroparaffin, bromooctadecane, bromopentadecane, bromononadecane, bromoeicosane, bromodocosane.

Mixtures of said substances are also suitable, as long as there is no lowering of melting point outside the desired range, and as long as the enthalpy of fusion of the mixture does not become too small for useful application.

By way of example, it is advantageous to use pure n-alkanes, n-alkanes with purity greater than 80%, or the alkane mixtures produced as industrial distillate and commercially available as such.

It may also be advantageous that compounds soluble in the lipophilic substances are added to those substances in order to inhibit the lowering of freezing point which sometimes occurs in the case of nonpolar substances. It is advantageous, as described in U.S. Pat. No. 5,456,852, to use compounds whose melting point is higher by from 20 to 120 K than that of the actual core substance. Suitable compounds are the substances mentioned above as lipophilic substances in the form of fatty acids, fatty alcohols, fatty amides, and also aliphatic hydrocarbon compounds. The amounts added of these, based on the capsule core, are from 0.1 to 10% by weight.

The latent-heat-accumulator materials are selected in accordance with the temperature range in which the heat accumulators are desired. By way of example, for heat accumulators in construction materials in moderate conditions of temperature and humidity it is preferable to use latent-heat-accumulator materials whose solid/liquid phase transition is within the temperature range from 0 to 60° C. Individual substances or mixtures with transition temperatures of from 15 to 30° C. are therefore generally selected for interior applications.

Preferred latent-heat-accumulator materials are aliphatic hydrocarbons, and particular preference is given to the materials listed above by way of example. Particular preference is given to aliphatic hydrocarbons having from 14 to 20 carbon atoms, and also to mixtures of these.

The polymer used for the capsule wall may in principle comprise any of the materials known for the microcapsules for copying papers. By way of example, it is possible to encapsulate the latent-heat-accumulator materials in gelatin with other polymers according to the processes described in GB-A 870476, U.S. Pat. Nos. 2,800,457, 3,041,289.

Wall materials which are preferred because they are highly resistant to ageing are thermoset polymers. Thermoset wall materials here are those which have a high degree of crosslinking and therefore do not soften but instead decompose at high temperatures. Examples of suitable thermoset wall materials are highly crosslinked formaldehyde resins, highly crosslinked polyureas, and highly crosslinked polyurethanes, and also highly crosslinked methacrylate polymers, and also uncrosslinked methacrylate polymers.

Formaldehyde resins are products of the reaction of formaldehyde with triazines, such as melamine
carbamides, such as urea
phenols, such as phenol, m-cresol, and resorcinol
amino and amido compounds, such as aniline, p-toluenesulfonamide, ethyleneurea, and guanidine, or a mixture of these.

Preferred formaldehyde resins serving as capsule wall material are urea-formaldehyde resins, urea-resorcinol-formaldehyde resins, urea-melamine resins, and melamine-formaldehyde resins. Preference is also given to the $C_1$-$C_4$-alkyl, in particular methyl, ethers of these formaldehyde resins, and also to mixtures with these formaldehyde resins. Particular preference is given to melamine-formaldehyde resins and/or their methyl ethers.

In the processes known from copying papers, the resins are used in the form of prepolymers. The prepolymer remains soluble in the aqueous phase and migrates in the course of the polycondensation to the phase boundary and encloses the oil droplets. Processes for microencapsulation with formaldehyde resins are well known and are described by way of example in EP-A-562 344 and EP-A-974 394.

Capsule walls composed of polyureas and of polyurethanes are likewise known from copying papers. The capsule walls are produced via reaction of $NH_2$- or OH-bearing reactants with di- and/or polyisocyanates. Examples of suitable isocyanates are ethylene diisocyanate, tetramethylene 1,4-diisocyanate, hexamethylene 1,6-diisocyanate, and tolylene 2,4- and 2,6-diisocyanate. Mention may also be made of polyisocyanates, such as derivatives having biuret structure, polyuretonimines, and isocyanurates. Reactants which may be used are: hydrazine, guanidine, and its salts, hydroxylamine, di- and polyamines, and amino alcohols. These interfacial polyaddition processes are disclosed by way of example in U.S. Pat. No. 4,021,595, EP-A 0 392 876 and EP-A 0 535 384.

Preference is given to microcapsules whose capsule wall is an uncrosslinked or crosslinked methacrylate polymer.

The polymers of the capsule wall generally comprise at least 30% by weight, preferably at least 40% by weight, particularly preferably at least 50% by weight, particularly at least 60% by weight, and very particularly preferably at least 70% by weight, or else up to 100% by weight, preferably at most 90% by weight, particularly at most 85% by weight, and very particularly preferably at most 80% by weight, of at least one copolymerized monomer from the group comprising $C_1$-$C_{24}$-alkyl esters of acrylic and/or methacrylic acid, acrylic acid, methacrylic acid, and maleic acid (monomers I), based on the total weight of the monomers.

The polymers of the capsule wall moreover preferably comprise at least 10% by weight, preferably at least 15% by weight, with preference at least 20% by weight, and also generally at most 70% by weight, with preference at most 60% by weight, and particularly preferably at most 50% by weight, of one or more copolymerized bi- or polyfunctional monomers which have no, or little, solubility in water (monomers II), based on the total weight of the monomers.

The polymers can also comprise up to 40% by weight, preferably up to 30% by weight, particularly up to 20% by weight, of other copolymerized monomers III. The capsule wall is preferably composed only of monomers of groups I and II.

The capsule wall of the microcapsules is preferably composed of from 30 to 100% by weight of one or more monomers (monomers I) from the group comprising $C_1$-$C_{24}$-alkyl esters of acrylic and/or methacrylic acid, acrylic acid, methacrylic acid, and maleic acid, from 0 to 70% by weight of one or more bi- or polyfunctional monomers (monomers II) which have no or little solubility in water, and from 0 to 40% by weight of one or more other monomers (monomers III), based in each case on the total weight of the monomers.

Suitable monomers I are $C_1$-$C_{24}$-alkyl esters of acrylic and/or methacrylic acid, and also the unsaturated $C_3$ and $C_4$ carboxylic acids, such as acrylic acid, methacrylic acid, and also maleic acid. Isopropyl, isobutyl, sec-butyl, and tert-butyl acrylate, and the corresponding methacrylates, are suitable monomers I, as also are, these being particularly preferred, methyl, ethyl, n-propyl and n-butyl acrylate, and the corresponding methacrylates. Preference is generally given to the methacrylates and methacrylic acid.

According to one preferred embodiment, the microcapsule walls comprise from 25% by weight to 75% by weight of copolymerized maleic acid, methacrylic acid, and/or acrylic acid, particularly methacrylic acid, based on the total amount of the monomers I.

Suitable monomers II are bi- or polyfunctional monomers which have no, or little, solubility in water but have good to limited solubility in the lipophilic substance. Little solubility means solubility smaller than 60 g/l at 20° C. Bi- or polyfunctional monomers are compounds which have at least two non-conjugated ethylenic double bonds. Divinyl and polyvinyl monomers are mainly used. They bring about crosslinking of the capsule wall during the polymerization process. It is possible to copolymerize one or more divinyl monomers, or else one or more polyvinyl monomers, or else divinyl monomers in a mixture with polyvinyl monomers.

According to one preferred embodiment, the monomer II used comprises a mixture composed of divinyl and polyvinyl monomers, where the proportion of the polyvinyl monomers is from 2 to 90% by weight, based on the entirety composed of divinyl and polyvinyl monomers. It is preferable that the proportion of the polyvinyl monomers is from 5 to 80% by weight, with preference from 10 to 60% by weight, based on the entirety composed of divinyl and polyvinyl monomers.

Divinylbenzene and divinylcyclohexane are suitable divinyl monomers. Preferred divinyl monomers are the diesters of diols with acrylic acid or methacrylic acid, and also the diallyl and divinyl ethers of said diols. Examples that may be mentioned are ethanediol diacrylate, ethylene glycol dimethacrylate, butylene 1,3-glycol dimethacrylate, methallylmethacrylamide, allyl acrylate, and allyl methacrylate. Particular preference is given to propanediol diacrylate, butanediol diacrylate, pentanediol diacrylate, and hexanediol diacrylate, and the corresponding methacrylates.

Preferred polyvinyl monomers are the polyesters of polyols with acrylic acid and/or methacrylic acid, and also the polyallyl and polyvinyl ethers of said polyols, trivinylbenzene, and trivinylcyclohexane. Particular preference is given to trimethylolpropane triacrylate and -methacrylate, pentaerythritol triallyl ether, pentaerythritol tetraallyl ether, pentaerythritol triacrylate, and pentaerythritol tetraacrylate, and also to industrial mixtures of these.

Preference is given to the combinations composed of divinyl and polyvinyl monomers, for example of butanediol diacrylate and pentaerythritol tetraacrylate, hexanediol diacrylate and pentaerythritol tetraacrylate, butanediol diacrylate and trimethylolpropane triacrylate, and also hexanediol diacrylate and trimethylolpropane triacrylate.

Monomers III that can be used are other monomers which differ from the monomers I and II, examples being vinyl acetate, vinyl propionate, vinylpyridine, and styrene, or α-methylstyrene. Particular preference is given to itaconic acid, vinylphosphonic acid, maleic anhydride, 2-hydroxyethyl acrylate, 2-hydroxyethyl methacrylate, acrylamido-2-methylpropanesulfonic acid, methacrylonitrile, acrylonitrile, methacrylamide, N-vinylpyrrolidone, N-methylolacrylamide, N-methylolmethacrylamide, dimethylaminoethyl methacrylate, and diethylaminoethyl methacrylate.

The production process for the microcapsules is what is known as in-situ polymerization. The principle of microcapsule formation is based on production of a stable oil-in-water emulsion from the monomers, from a free-radical initiator, from the protective colloid, and from the lipophilic substance to be encapsulated. The polymerization of the monomers is then initiated via heating and is optionally controlled via a further increase in temperature, whereupon the resultant polymers form the capsule wall which encloses the lipophilic substance. This general principle is described by way of example in DE-A-101 39 171, the content of which is expressly incorporated herein by way of reference.

The starting emulsion is stabilized with the aid of a protective colloid.

Organic protective colloids are preferably water-soluble polymers which lower the surface tension of water from 73 mN/m to at most from 45 to 70 mN/m, and thus ensure the formation of closed capsule walls, and also microcapsules with preferred sizes in the range from 0.5 to 50 µm, preferably from 0.5 to 30 µm, particularly from 0.5 to 10 µm.

Examples of neutral organic protective colloids are cellulose derivatives, such as hydroxyethylcellulose, methylhydroxyethylcellulose, methylcellulose, and carboxymethylcellulose, polyvinylpyrrolidone, copolymers of vinylpyrrolidone, gelatin, gum arabic, xanthan, casein, polyethylene glycols, polyvinyl alcohol, and partially hydrolyzed polyvinyl acetates, and also methylhydroxypropylcellulose. Preferred neutral organic protective colloids are polyvinyl alcohol and partially hydrolyzed polyvinyl acetates, and also methylhydroxypropylcellulose. These protective colloids are described in WO 2008/046839, the content of which is expressly incorporated herein by way of reference.

Anionic organic protective colloids are sodium alginate, polymethacrylic acid, and its copolymers, polyacrylic acid, and its copolymers, the copolymers of sulfoethyl acrylate and of sulfoethyl methacrylate, of sulfopropyl acrylate and of sulfopropyl methacrylate, of N-(sulfoethyl)maleimide, of 2-acrylamido-2-alkylsulfonic acids, of styrenesulfonic acid, and also of vinylsulfonic acid. Preferred anionic organic protective colloids are naphthalenesulfonic acid and naphthalenesulfonic-acid-formaldehyde condensates, and also especially polyacrylic acids and phenolsulfonic-acid-formaldehyde condensates.

Inorganic protective colloids that may be mentioned are those known as Pickering systems, which can provide stabilization via very fine solid particles and are insoluble in water, but dispersible, or insoluble and not dispersible in water, but wettable by the lipophilic substance. The mode of action and the use of these materials is described in EP-A-1 029 018, and also EP-A-1 321 182, the contents of which are expressly incorporated herein by way of reference.

A Pickering system here can be composed of the solid particles alone or also of auxiliaries which improve the dispersibility of the particles in water or the wettability of the particles by the lipophilic phase.

The solid inorganic particles can be metal salts, such as salts, oxides, and hydroxides of calcium, magnesium, iron, zinc, nickel, titanium, aluminum, silicon, barium, and manganese. Mention may be made of magnesium hydroxide, magnesium carbonate, magnesium oxide, calcium oxalate, calcium carbonate, barium carbonate, barium sulfate, titanium dioxide, aluminum oxide, aluminum hydroxide, and zinc sulfide. Mention may also be made of silicates, bentonite, hydroxyapatite, and hydrotalcites. Particular preference is given to fine-particle silicas, and to magnesium pyrophosphate, and tricalcium phosphate.

The Pickering systems can either be added first to the aqueous phase or else added to the stirred oil-in-water emulsion. Some fine, solid particles are prepared via precipitation, as described in EP-A-1 029 018, and also EP-A-1 321 182.

The fine-particle silicas can take the form of fine, solid particles when dispersed in water. However, it is also possible to use what are known as colloidal dispersions of silica in water. These colloidal dispersions are alkaline, aqueous mixtures of silica. In the alkaline pH range, the particles are swollen particles stable in water. For use of these dispersions as a Pickering system, it is advantageous to use an acid to adjust the pH of the oil-in-water emulsion to from 2 to 7.

The amounts generally used of the protective colloids are from 0.1 to 15% by weight, preferably from 0.5 to 10% by weight, based on the water phase. Preferred amounts selected here for inorganic protective colloids are from 0.5 to 15% by weight, based on the water phase. The amounts preferably used of organic protective colloids are from 0.1 to 10% by weight, based on the water phase of the emulsion.

According to one embodiment, preference is given to inorganic protective colloids, and also to their mixtures with organic protective colloids.

According to another embodiment, preference is given to neutral organic protective colloids.

Preference is given to protective colloids bearing OH groups, examples being polyvinyl alcohols and partially hydrolyzed polyvinyl acetates.

It is moreover possible to add surfactants for co-stabilization, preference being given to nonionic surfactants. Suitable surfactants can be found in "Handbook of Industrial Surfactants", the content of which is expressly incorporated herein by way of reference. An amount of from 0.01 to 10% by weight of the surfactants, based on the water phase of the emulsion, can be used.

The production of the preferred microcapsules based on polymethacrylate, and also the auxiliaries suitable for this purpose, such as free-radical initiators and optionally regulators, are known and described by way of example in EP-A-1 029 018, DE 10 163 162, and WO 2008/071649, the disclosure in which is expressly incorporated herein by way of reference. The peroxo and azo compounds mentioned therein as free-radical initiators for the free-radical polymerization reaction are therefore particularly advantageously used in amounts of from 0.2 to 5% by weight, based on the weight of the monomers.

It is possible to treat the microcapsules with polyelectrolyte, and this can sometimes give a further improvement in the impermeability of the capsules. WO 2008/006762 and WO 2008/046839 describe processes for their production, and also suitable polyelectrolytes, and are expressly incorporated herein by way of reference.

The Rigid Polyurethane Foam Layer

The rigid foams used for composite elements composed of rigid polyurethane foam have been known for a long time and are widely described in the literature. When the term reactive rigid foam system is used below, it means the mixture of the starting components.

The rigid polyurethane foam is a polymer layer whose average density is from 20 to 150 kg/m$^3$, preferably from 25 to 100 kg/m$^3$, particularly preferably from 30 to 70 kg/m$^3$.

For the purposes of the invention, rigid polyurethane foam is preferably a foam according to DIN 7726, and this means that the compressive stress of the foam at 10% compression, or compressive strength in accordance with DIN 53 421/DIN EN ISO 604 is greater than or equal to 80 kPa, preferably greater than or equal to 150 kPa. The rigid polyurethane foam moreover has a closed-cell factor greater than 85%, preferably greater than 90%, in accordance with DIN ISO 4590.

For the purposes of the present invention, the isocyanate index is the stoichiometric ratio of isocyanate groups to groups reactive toward isocyanate, multiplied by 100. Groups reactive toward isocyanate here are any of the groups which are comprised in the reaction mixture and are reactive toward isocyanate, including chemical blowing agents, but not including the isocyanate group itself. The amounts reacted with one another of the isocyanates and of the compounds having hydrogen atoms reactive toward isocyanates are such that the isocyanate index is in the range from 100 to 700, preferably from 115 to 180. In another preferred embodiment, an isocyanate index of from 180 to 700 is used, in particular from 200 to 500. In such cases, the term "polyisocyanurate-modified polyurethane foams" or "polyisocyanurate foams" is then used.

The materials are usually produced via reaction of organic di- and/or polyisocyanates a) with compounds b), preferably polyols, where these compounds have at least two hydrogen atoms reactive toward isocyanate groups.

Organic di- and polyisocyanates a) that can be used are the abovementioned, preferably aromatic polyfunctional isocyanates, and also the modified polyfunctional isocyanates. Alongside these, it is also possible to use reaction products of polyfunctional isocyanates with polyhydric polyols, these being known as prepolymers, or else a mixture of these with other di- and polyisocyanates.

An organic polyisocyanate which has proven particularly successful is crude MDI with NCO content of from 29 to 33% by weight and with viscosity at 25° C. in the range from 100 to 2000 mPa·s, in particular in the range from 100 to 800 mPa·s.

Compounds b) that are used, having at least two hydrogen atoms reactive toward isocyanate, are generally those which bear at least two reactive groups selected from OH, SH, NH, $NH_2$ groups, and CH-acidic groups in the molecule, particularly polyether polyols and/or the abovementioned polyester polyols having OH numbers in the range from 50 to 800 mg KOH/g.

The functionality of the polyester polyols used is mostly from 1.5 to 4, their OH number being from 50 to 400 mg KOH/g, preferably from 150 to 300 mg KOH/g.

The polyether polyols are produced by known processes, for example via anionic polymerization of alkylene oxides in the presence of catalysts, such as alkali metal hydroxides.

Alkylene oxides used are mostly ethylene oxide and/or propylene oxide, preferably pure propylene 1,2-oxide.

Starter molecules that are in particular used are compounds having at least 2, preferably from 3 to 8, hydroxy groups, or having at least two primary amino groups, in the molecule.

Preferred starter molecules used having at least 2, preferably from 2 to 8, hydroxy groups in the molecule are trimethylolpropane, glycerol, pentaerythritol, sugar compounds, such as glucose, sorbitol, mannitol, and sucrose, polyhydric phenols, and resols, such as oligomeric condensates composed of phenol and formaldehyde, and Mannich condensates composed of phenols and formaldehyde and of dialkanolamines, and also melamine.

Preferred starter molecules used having at least two primary amino groups in the molecule are aromatic di- and/or polyamines, such as phenylenediamines, 2,3-, 2,4-, 3,4-, and 2,6-tolylenediamine, and 4,4'-, 2,4'-, and 2,2'-diaminodiphenylmethane, and also aliphatic di- and polyamines, such as ethylenediamine.

The functionality of the polyether polyols is preferably from 2 to 8, their hydroxy numbers preferably being from 50 mg KOH/g to 800 mg KOH/g, and in particular from 150 mg KOH/g to 570 mg KOH/g.

Among the compounds b) having at least two hydrogen atoms reactive toward isocyanate are also the crosslinking agents and chain extenders which are optionally used concomitantly. Addition of difunctional chain extenders, or of crosslinking agents of functionality three and higher or else optionally mixtures thereof can prove advantageous for modification of mechanical properties. Preferred chain extenders and/or crosslinking agents used are alkanolamines, and diols and/or triols, in particular diols and/or triols whose molecular weights are below 400, preferably from 60 to 300.

The amount advantageously used of chain extenders, crosslinking agents, or a mixture thereof is from 1 to 20% by weight, preferably from 2 to 5% by weight, based on the polyol component b).

Further information concerning the polyether polyols and polyester polyols used, and also their production, is found by way of example in Kunststoffhandbuch [Plastics handbook], volume 7 "Polyurethane" [Polyurethanes] edited by Günter Oertel, Carl-Hanser-Verlag Munich, 3rd edition, 1993.

The rigid polyurethane foams are usually produced in the presence of blowing agents, the abovementioned catalysts, and cell stabilizers, and also, if necessary, further auxiliaries and/or additives, these being well known in polyurethane chemistry and described in DE-A-101 24 333, which is expressly incorporated herein by way of reference. Auxiliaries and/or additives used are the substances known per se for this purpose, examples being surfactants, foam stabilizers, cell regulators, fillers, pigments, dyes, flame retardants, hydrolysis stabilizers, antistatic agents, and fungistatic and bacteriostatic agents. Further details concerning the starting materials used for the conduct of the process of the invention, and blowing agents and catalysts, and also auxiliaries and/or additives are found by way of example in Kunststoffhandbuch, volume 7, "Polyurethane" [Polyurethanes] Carl-Hanser-Verlag Munich, 1st edition, 1966, 2nd edition, 1983, and 3rd edition, 1993.

Blowing agents that can be used are the chemical and/or physical blowing agents which are conventional for polyurethane chemistry. Chemical blowing agents are compounds which form gaseous products via reaction with isocyanate, examples being water or formic acid. Physical blowing agents are compounds which have been emulsified or dissolved in the starting materials for polyurethane production and vaporize under the conditions of polyurethane formation. Examples of these are hydrocarbons, such as pentane, cyclopentane, isopentane, and also mixtures of the isomers, other examples being halogenated hydrocarbons and other compounds such as perfluorinated alkanes, e.g. perfluorohexane, fluorochlorocarbons, and ethers, esters, ketones, and/or acetals.

The amount usually used of the blowing agent component is from 1 to 30% by weight, preferably from 2 to 20% by weight, and particularly preferably from 3 to 12% by weight, based on the total weight of the polyol component b), and depends on the desired target density of the rigid polyurethane foam.

It is also possible to use the abovementioned flame retardants which are conventional for polyurethane chemistry.

For the rigid polyisocyanurate foams, catalysts and catalyst mixtures are usually also used, and catalyze the trimerization reaction of the NCO groups with one another. By way of example, mention may be made of metal salts, and specifically the ammonium, alkali metal, or alkaline earth metal salts of carboxylic acids. It is preferable here to use the salts of linear or branched, substituted or unsubstituted, saturated or unsaturated carboxylic acids having from 1 to 20 carbon atoms, examples being formic acid, acetic acid, octanoic acid, tartaric acid, citric acid, oleic acid, stearic acid, or ricinoleic acid, or substituted or unsubstituted, aromatic carboxylic acids having from 6 to 20 carbon atoms, examples being benzoic acid or salicylic acid. Particular preference is given to potassium formate, potassium acetate, potassium octoate (potassium 2-ethylhexanoate), ammonium formate, ammonium acetate, and ammonium octoate, in particular potassium formate and potassium acetate.

The rigid polyurethane foams can be produced batchwise or continuously with the aid of known mixing apparatuses. The polyol component can be fed in advance with separate pumps, catalysts, and/or blowing agent. All of the reaction components are generally mixed simultaneously, usually in a mixing head. The starting components are mostly mixed at a temperature of from 15 to 35° C., preferably from 20 to 30° C.

The Construction Element

The construction elements of the invention preferably have A-B-C-A' or A-B-C-B-A structure. According to the invention, the microcapsules comprising the latent-heat-accumulator material are comprised in the compact polyurethane layer B.

The microcapsules are applied to the metallic outer layer by means of the reactive compact polyurethane system. This application can take place in an isolated step of the process, or directly during the production of the sheet-like construction element.

According to the invention, microcapsules are dispersed in one or more of the starting components of the reactive compact polyurethane system. The microcapsules here can be suspended directly prior to the mixing of the starting components and the application to an outer layer, or can be kept in inventory in suspension in one or more starting components.

According to one preferred embodiment, the microcapsules are dispersed in the compound b) having at least two hydrogen atoms reactive toward isocyanate groups, preferably the polyol component. The viscosity of the polyol component (without addition of microcapsules) is preferably from 100 to 2000 mPa·s, with preference from 150 to 800 mPa·s, at 25° C.

In another embodiment of the invention, a dispersing agent can be added as auxiliary to the polyol component. By way of example of dispersing agent, mention may be made of dispersing agents commercially available, such as the BYK-W series of additives from BYK-Chemie GmbH. By this method it is possible to improve the flow behavior of the component comprising the accumulator material, and of the reactive compact polyurethane system, thus giving easier processing.

The amount of microcapsules can be freely selected, and is determined via the desired amount of microcapsules per unit area of the sheet-like construction element. This is generally determined via the desired thickness of the reactive compact polyurethane system layer in the construction element, and via the desired maximum processing viscosity of the starting components for the reactive compact polyurethane system.

It is preferable that from 20 to 3000 g of microcapsules are applied per $m^2$ of sheet-like construction element, with preference from 100 to 2000 g, particularly from 500 to 1500 g.

According to one preferred embodiment, from 5 to 30% by weight of microcapsules are used, based on the mixture composed of reactive compact polyurethane system and microcapsules.

The thickness of the compact polyurethane layer is generally from 0.1 to 3 cm, preferably from 0.25 to 2.5 cm, particularly preferably from 0.5 to 2 cm, particularly from 0.5 to 1.5 cm.

The construction element can be produced either batchwise or continuously. The reaction mixture can also be cast into closed support molds (e.g. compression molds), using high- or low-pressure feed machinery. This technology is used by way of example for batchwise manufacture of composite elements of the invention.

According to one preferred embodiment, the construction elements are produced batchwise by way of example in a compression mold.

According to another preferred embodiment, the construction elements are produced continuously, e.g. in a twin-belt system. Here, the upper and the lower metallic outer layer are wound off from a roll and optionally profiled, heated, and pretreated, e.g. corona-treated, in order to improve the ability of the outer layers to accept foam. The various reaction mixtures, in each case mixed, for example in a high-pressure mixing head, are then applied in succession to the lower outer layer, and hardened between upper and lower outer layer in the "twin belt". After leaving the twin belt, the continuous strip is cut to size in the desired dimensions.

The present invention also provides a process for the production of sheet-like construction elements, comprising the application of a compact polyurethane layer (B) and of a rigid polyurethane foam layer (C) to a metallic outer layer and finally the application of a second metal outer layer and optionally of an additional compact polyurethane layer between the adjacent layers (A) and (C).

It is moreover possible to use a conventional adhesion promoter, in order to achieve better adhesion between the layers (A) and (C), i.e. in the case of the layer structure (A)-(B)-(C)-(A). Adhesion promoters of this type correspond chemically to the compact polyurethane system, except that they comprise no microcapsules.

According to one preferred variant, the reactive compact polyurethane system comprising microcapsules is applied to a lower metallic outer layer, where it cures, and then the reactive rigid polyurethane foam system is applied, and this then foams and hardens, and optionally a further layer of the reactive compact polyurethane system comprising microcapsules is applied, and finally the upper metallic outer layer is applied.

According to one production variant, likewise preferred, the reactive rigid polyurethane foam system is applied to the metallic outer layer, where it foams and cures, and this is followed by application of the reactive compact polyurethane system, comprising the microcapsules, and finally the upper outer layer is applied.

In one particular embodiment of the process of the invention, the chronological separation between application of the reactive rigid foam system to the compact polyurethane system, or the application of the reactive compact polyurethane system to the rigid foam system, is selected in such a way that the compact polyurethane system or the rigid foam system has not yet completely hardened, the aim being to improve the adhesion between the two systems.

The production process described above is one preferred embodiment of the production process. Other production processes which are prior art and known to the person skilled in the art can equally be used.

This method also permits production of the construction elements of the invention, "sandwich elements", with different metallic outer layers. They then have, directly behind the metal outer layer(s), one or two layers which are close to the surface and which can accumulate heat.

The thickness of the construction elements of the invention is usually from 20 to 300 mm, and the usual range of density of the rigid polyurethane foam for the production of said moldings is from 20 to 150 kg/$m^3$, preferably from 25 to 100 kg/$m^3$ (Kunststoffhandbuch [Plastics handbook], 3rd edition, page 150).

Unsatisfactory internal atmospheric conditions can be avoided by using the construction elements of the invention. The buildings produced therewith exhibit not only good thermal insulation but also a marked improvement in temperature profile and, with this, in energy consumption. The construction elements are preferably used in domestic construction, industrial construction, or cold-store construction, or in sectional doors, in portable office accommodation, or in residential-trailer construction.

INVENTIVE EXAMPLE 1

Polyol Component for Compact System
44 parts by weight of polyetherol 1, having functionality of 3 and hydroxy number of 40 mg KOH/g
36 parts by weight of polyetherol 2, having functionality of 3 and hydroxy number of 410 mg KOH/g
20 parts by weight of polyetherol 3, having a functionality of 2 and hydroxy number of 104 mg KOH/g
1 part by weight of solution of an amine-containing PU catalyst
Polyol Component for Rigid Foam System
15 parts by weight of tris(2-chloroisopropyl) phosphate flame retardant
58 parts by weight of polyetherol 4, having functionality of 4.3 and hydroxy number of 490 mg KOH/g
15 parts by weight of polyetherol 2
10 parts by weight of polyetherol 3
2 parts by weight of silicone-containing foam stabilizer
1.5 parts by weight of amine-containing PU catalyst
0.5 part by weight of amine-containing blowing catalyst
8 parts by weight of 1,1,1,3,3-pentafluoropropane
3 parts by weight of 85% formic acid The sheet-like construction element composed of composite material was produced with the aid of a cubic mold, sealable and temperature-controlled to 45° C., with internal dimensions 20×20×8 cm (B×L×H). A metal sheet of dimensions 20×20 cm was placed on the base of the mold. The sealable lid of the mold was slightly magnetic, and it was therefore possible to fix to it a further metal sheet of dimensions 20×20 cm. The side walls of the mold had been treated with a silicone-containing release agent, with the aim of facilitating subsequent demolding of the construction element.

40 g of microcapsules (produced according to example 1 of WO 2008/006762, using a wall polymer composed of 20 parts by weight of methacrylic acid, 40 parts by weight of methyl methacrylate, and 40 parts by weight of butanediol acrylate, but using hexadecane as latent-heat-accumulator material) were dispersed in 60 g of the polyol component of the compact system (40% strength by weight dispersion). The dispersion was then mixed with 50 g of Lupranat M 50 (polymeric MDI (NCO content 31.5% by weight) from BASF SE).

This mixture was applied in the form of a layer of thickness 1 cm to a metal sheet of dimensions 20×20 cm, located within the mold. After 2 minutes, a mixture composed of 85 g of polyol component of the rigid foam system and 85 g of Lupranat M 50 was applied to the compact system comprising microcapsules, which was completing its reaction, and the mold was then closed. After 8 minutes, the mold was reopened, and a construction element was obtained, composed of, from above to below: a lower metallic outer layer, a compact polyurethane layer, comprising microcapsules, a rigid polyurethane foam layer, and an upper metallic outer layer.

COMPARATIVE EXAMPLE (NOT INVENTIVE)

An element of identical structure was produced, merely comprising no PCM microcapsules in the compact polyurethane layer. 80 g of the polyol component of the compact system (without microcapsules) were therefore mixed with 70 g of Lupranat M 50, and applied to the metal sheet.

The two construction elements exhibited the same thermal conductivity, but in the case of the construction element of the invention a markedly larger amount of heat was absorbed prior to achievement of constant heat flux.

The invention claimed is:

1. A construction element, comprising a composite material, comprising:
   a first metallic outer layer (A);
   a second metallic outer layer (A');
   a rigid polyurethane foam layer (C) disposed between the first metallic outer layer (A) and the second metallic outer layer (A'); and
   a compact polyurethane layer (B) disposed between the first metallic outer layer (A) and the second metallic outer layer (A') which comprises a plurality of microcapsules,
   wherein a core of the plurality of the microcapsules comprises a latent-heat-accumulator material,
   wherein a wall of the plurality of the microcapsules comprises, in polymerized form,
   from 30 to 100% by weight of a first monomer (monomer I) selected from the group consisting of a $C_1$-$C_{24}$-alkyl ester of acrylic acid, a $C_1$-$C_{24}$-alkyl ester of methacrylic acid, acrylic acid, methacrylic acid, and maleic acid,
   from 0 to 70% by weight of a bi- or polyfunctional second monomer (monomer II) having no or little solubility in water, and
   from 0 to 40% by weight of a third monomer (monomer III),
   based in each case on a total weight of the first, second, third monomers (monomers I, II, and III),
   wherein the construction element is a sheet.

2. The construction element of claim 1, having the following sequence of layers:
   the first metallic outer layer (A),
   the compact polyurethane layer (B),
   the rigid polyurethane foam layer (C), and
   the second metallic outer layer (A').

3. The construction element of claim 2, wherein a density of the compact polyurethane layer (B) is from 400 to 1200 kg/m³.

4. The construction element of claim 2, wherein the compact polyurethane layer (B) comprises, in reacted form, at least one selected from the group consisting of an organic diisocyanate and an organic polyisocyanate, at least one selected from the group consisting of a polyether polyol and a polyester polyol, optionally, a catalyst, and, optionally, an auxiliary.

5. The construction element of claim 2, wherein the latent-heat-accumulator material is an organic lipophilic substance with a solid/liquid phase transition in a temperature range from −20 to 120° C.

6. The construction element of claim 2, wherein an average density of the rigid polyurethane foam layer (C) is from 20 to 150 kg/m³.

7. The construction element of claim 1, wherein a density of the compact polyurethane layer (B) is from 400 to 1200 kg/m³.

8. The construction element of claim 7, wherein the compact polyurethane layer (B) comprises, in reacted form, at least one selected from the group consisting of an organic diisocyanate and an organic polyisocyanate, at least one selected from the group consisting of a polyether polyol and a polyester polyol, optionally, a catalyst, and, optionally, an auxiliary.

9. The construction element of claim 7, wherein the latent-heat-accumulator material is an organic lipophilic substance with a solid/liquid phase transition in a temperature range from −20 to 120° C.

10. The construction element of claim 7, wherein an average density of the rigid polyurethane foam layer (C) is from 20 to 150 kg/m³.

11. The construction element of claim 1, wherein the compact polyurethane layer (B) comprises, in reacted form, at least one selected from the group consisting of an organic diisocyanate and an organic polyisocyanate, at least one selected from the group consisting of a polyether polyol and a polyester polyol, optionally, a catalyst, and, optionally, an auxiliary.

12. The construction element of claim 11, wherein the latent-heat-accumulator material is an organic lipophilic substance with a solid/liquid phase transition in a temperature range from −20 to 120° C.

13. The construction element of claim 11, wherein an average density of the rigid polyurethane foam layer (C) is from 20 to 150 kg/m³.

14. The construction element of claim 1, wherein the latent-heat-accumulator material is an organic lipophilic substance with a solid/liquid phase transition in a temperature range from −20 to 120° C.

15. The construction element of claim 14, wherein an average density of the rigid polyurethane foam layer (C) is from 20 to 150 kg/m³.

16. The construction element of claim 1, wherein an average density of the rigid polyurethane foam layer (C) is from 20 to 150 kg/m³.

17. The construction element of claim 1, wherein the rigid polyurethane foam layer (C) comprises, in reacted form, at least one selected from the group consisting of an organic diisocyanate and an organic polyisocyanate, at least one selected from the group consisting of a polyether polyol and a polyester polyol, a blowing agent, optionally, a catalyst, and optionally an additional auxiliary.

18. A process for producing the construction element of claim 1, comprising:
  (i) applying the compact polyurethane layer (B) on the first metallic outer layer (A);
  (ii) applying the rigid polyurethane foam layer (C) on a surface of the compact polyurethane layer (B) facing away from the first metallic outer layer (A);
  (iii) applying the second metallic outer layer (A') on a surface of the rigid polyurethane foam layer (C) facing away from the compact polyurethane layer (B); and
  optionally applying an additional compact polyurethane layer (B) between the rigid polyurethane foam layer (C) and the second metallic outer layer (A').

19. The process of claim 18, which is continuous.

20. A method for producing a residential, industrial, cold-store, sectional door, portable office accommodation, or residential-trailer construction, the method comprising incorporating the construction element of claim 1 into a structural element, facade, roof, or wall of the construction.

* * * * *